United States Patent
Edme (10) Patent No.: US 10,343,844 B2
(45) Date of Patent: Jul. 9, 2019

(54) STORING SENSOR DEVICES

(71) Applicant: WESTERNGECO LLC, Houston, TX (US)

(72) Inventor: Pascal Guillaume Edme, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 0 days.

(21) Appl. No.: 15/501,174

(22) PCT Filed: Aug. 25, 2015

(86) PCT No.: PCT/US2015/046637
§ 371 (c)(1),
(2) Date: Feb. 1, 2017

(87) PCT Pub. No.: WO2016/032999
PCT Pub. Date: Mar. 3, 2016

(65) Prior Publication Data
US 2017/0225889 A1 Aug. 10, 2017

Related U.S. Application Data (60) Provisional application No. 62/041,279, filed on Aug. 25, 2014.

(51) Int. Cl.
*B65G 1/04* (2006.01)
*G01V 1/00* (2006.01)
*G01V 1/16* (2006.01)
*G01V 13/00* (2006.01)

(52) U.S. Cl.
CPC .......... *B65G 1/0457* (2013.01); *G01V 1/003* (2013.01); *G01V 1/16* (2013.01); *G01V 1/168* (2013.01); *G01V 13/00* (2013.01)

(58) Field of Classification Search
CPC ...... B65G 1/0457; B65G 9/008; B65G 17/20; B65G 47/61; G01V 1/16
USPC .................................. 198/465.4, 485.1–486.1
See application file for complete search history.

(56) References Cited

U.S. PATENT DOCUMENTS

| | | | | |
|---|---|---|---|---|
| 2,796,974 A | * | 6/1957 | Weinberger | B65G 47/61 198/408 |
| 3,184,042 A | * | 5/1965 | Rutkovsky | B65G 17/20 198/367 |
| 3,396,580 A | * | 8/1968 | Cole | B01L 99/00 136/234 |
| 4,346,799 A | * | 8/1982 | Dunville | B65G 47/61 198/367 |
| 4,838,036 A | * | 6/1989 | Norrie | A22B 7/005 198/465.4 |
| 4,917,369 A | * | 4/1990 | Moll | A41H 43/0271 156/364 |

(Continued)

OTHER PUBLICATIONS

International Preliminary Report on Patentability for the equivalent International patent application PCT/US2015/046637 dated Mar. 9, 2017.

*Primary Examiner* — Mark A Deuble
(74) *Attorney, Agent, or Firm* — Kevin B. McGoff (57) ABSTRACT

To store sensor devices in a sensor storage system, the sensor devices are hanged on hangers in the sensor storage system. The sensor devices are transported through stations of the sensor storage system.

5 Claims, 5 Drawing Sheets

(56) References Cited

U.S. PATENT DOCUMENTS

| | | | |
|---|---|---|---|
| 5,000,309 A * | 3/1991 | Dooley | B65G 17/485 |
| | | | 105/149 |
| 5,226,525 A * | 7/1993 | Dooley | B65G 17/20 |
| | | | 105/149 |
| 5,610,346 A | 3/1997 | Stelts | |
| 5,927,472 A | 7/1999 | Neef et al. | |
| 7,724,607 B2 | 5/2010 | Ray et al. | |
| 8,050,140 B2 | 11/2011 | Ray et al. | |
| 9,169,068 B2 * | 10/2015 | Wend | B65G 1/026 |
| 2001/0051085 A1 * | 12/2001 | Klein | B65G 1/0457 |
| | | | 414/282 |
| 2007/0039632 A1 | 2/2007 | Dean et al. | |
| 2009/0147619 A1 | 6/2009 | Welker | |
| 2010/0314223 A1 * | 12/2010 | Franz | B65G 17/20 |
| | | | 198/802 |
| 2011/0214967 A1 | 9/2011 | Wend et al. | |
| 2011/0253504 A1 | 10/2011 | Hazenbroek | |
| 2012/0082001 A1 | 4/2012 | Hazenbroek et al. | |

* cited by examiner

STORING SENSOR DEVICES

CROSS-REFERENCE TO RELATED APPLICATION

This application claims the benefit under 35 U.S.C. § 119(e) of U.S. Provisional Application No. 62/041,279, filed Aug. 25, 2014, which is hereby incorporated by reference.

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g. geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

In general, according to some implementations, to store sensor devices in a sensor storage system, the sensor devices are hanged on hangers in the sensor storage system. The sensor devices are transported through stations of the sensor storage system.

Other features will become apparent from the following description, from the drawings, and from the claims.

BRIEF DESCRIPTION OF THE DRAWINGS

Some embodiments of the present disclosure are described with respect to the following figures.

DETAILED DESCRIPTION

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface (land surface or bottom surface of a body of water, such as a seafloor) to measure seismic waves reflected from a subterranean structure, in response to seismic waves (or impulses) produced by one or more seismic sources and propagated into an earth subsurface. A particle motion sensor provided at a ground surface can refer to a particle motion sensor that is placed in contact with the ground surface, partially buried in the ground surface, or completely buried in the ground surface up to a predetermined depth (e.g. up to a depth of less than 5 meters). A particle motion sensor at (or proximate) the earth surface can record the vectorial part of an elastic wavefield just below the free surface (i.e. ground surface).

Particle motion sensors can also be towed through a body of water on a marine streamer, or alternatively, can be provided on a seabed cable.

Although reference is made to surveying subterranean structures in the disclosure, it is contemplated that sensor devices can be applied to other types of target structures, such as human tissue, mechanical structures, plant tissue, animal tissue, solid volumes, substantially solid volumes, volumes of liquid, volumes of gas, volumes of plasma, and volumes of space near and/or outside the atmosphere of a planet, asteroid, comet, moon, or other body, and so forth.

Figure 1:
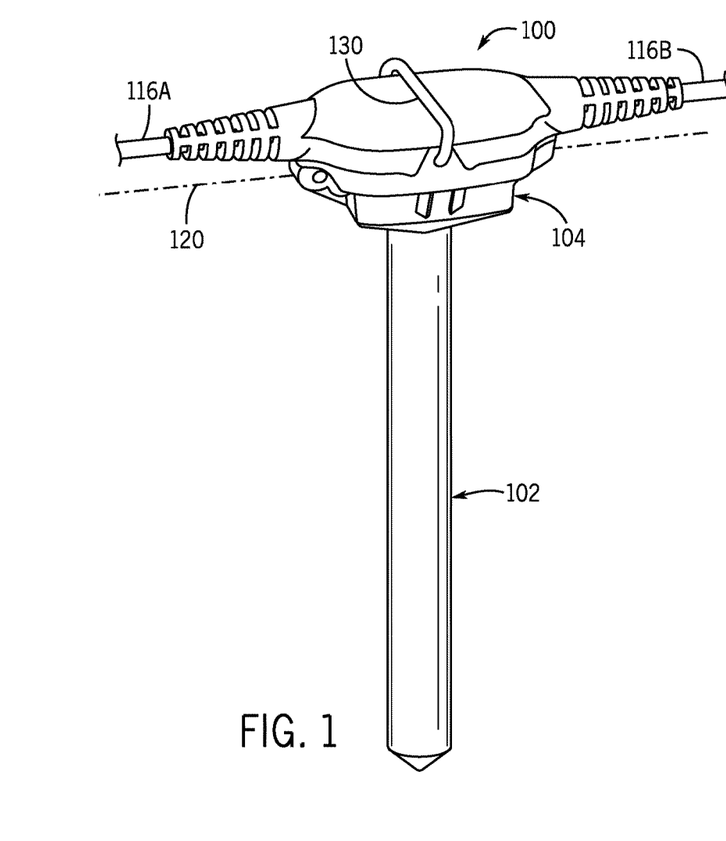
FIG. 1 is a perspective view of a sensor device, according to various implementations.
Figure 6:
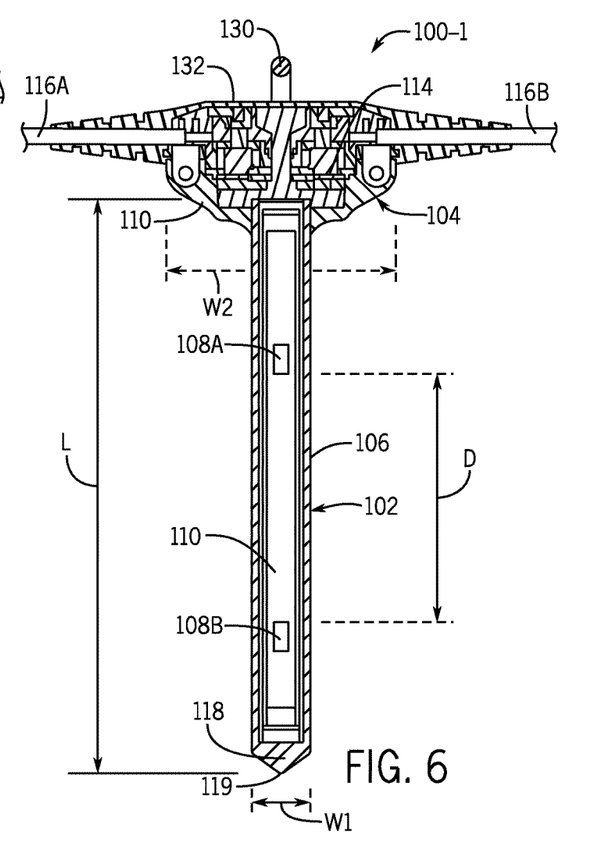
FIG. 6 is a cross-sectional view of the sensor device of FIG. 1, according to some implementations.

FIG. 1 is a perspective side view of an example seismic sensor device 100 according to some implementations. FIG. 6 is a sectional view of the sensor device 100 (FIG. 6 is discussed further below). The sensor device 100 of FIG. 1 includes a stick-shaped portion 102 and an enlarged portion 104. FIG. 1 shows a portion of the sensor device 100 being below a ground surface 120, and a portion of the sensor device 100 being above the ground surface 120. Circuitry (discussed further below) contained in the enlarged portion 104 can be coupled to communication media 116A and 116B (e.g. electrical cables, fiber optic cables, etc.). Data acquired by the sensor components in the seismic sensor device 100 is transferred over the communication media 116A, 116B for communication to a remote station, which can be a recording station, a computer, and so forth. In other examples, the circuitry can communicate wirelessly over a wireless medium over which data can be communicated.

The seismic sensor device 100 further includes an attachment handle 130. The attachment handle 130 can engage a hanger of a sensor storage system, as discussed further below. Although a specific attachment mechanism in the form of the attachment handle 130 is shown in FIG. 1, it is noted that in other examples, a different type of attachment mechanism can be provided on the seismic sensor device 100 to allow the seismic sensor device 100 to be attached to a hanger of a sensor storage system. As examples, the attachment mechanism can include a groove, a slot, and so forth.

Although reference is made to seismic sensor devices in some implementations, it is noted in other implementations, sensor devices can include electromagnetic (EM) sensor devices, which can measure EM signals affected by a subterranean structure, or other target structure. A source of EM signals can include an active EM source that generates and transmits EM signals, or a passive EM source, such as sources that produce naturally occurring EM signals.

In the ensuing discussion, reference is made to seismic sensor devices. However, in other implementations, techniques or mechanisms can be applied to other types of sensor devices, including EM sensor devices and so forth.

Figure 2:
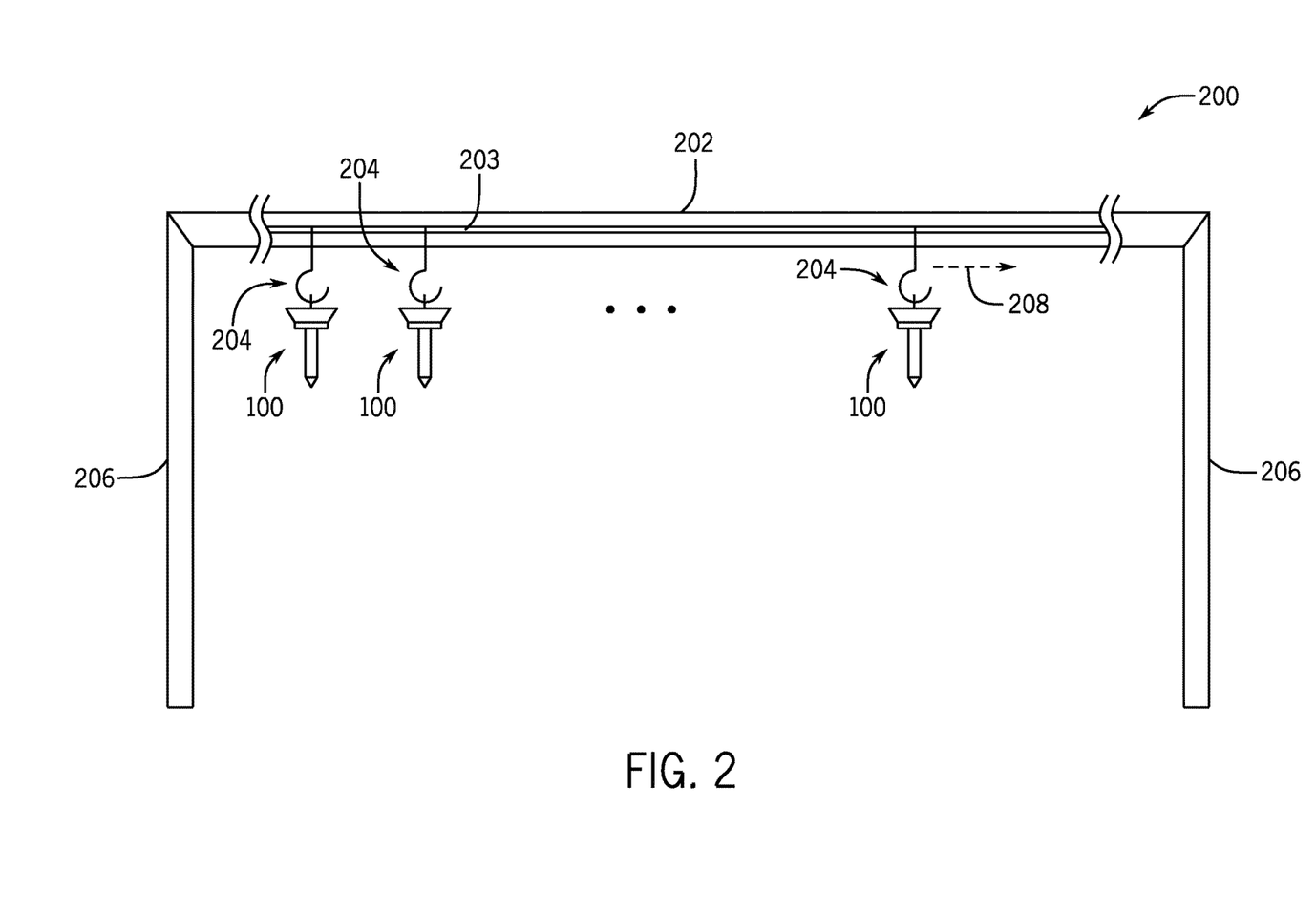
FIGS. 2, 3, and 5 are schematic diagrams of example sensor storage systems according to various implementations.

Prior to or after deployment of seismic sensor devices in the field for measuring survey data from a subterranean structure (or from another target structure), the seismic sensor devices can be stored in a sensor storage system according to some implementations. An example sensor storage system 200 is shown in FIG. 2. The sensor storage system 200 includes a support member 202 with hangers 204 for hanging seismic sensor devices 100. The support member 202 is coupled to support legs 206 to support the support member 202. Each hanger 204, which can be in the form of a hook or any other support feature that can be attached to an attachment mechanism (e.g. the attachment handle 130) of a seismic sensor device 100, is able to attach to the a seismic sensor device 100.

"Hanging" a seismic sensor device 100 using a hanger (e.g. 204) can refer to any mounting or attachment technique to attach the seismic sensor device 100 to the hanger such that at least a portion of the seismic sensor device 100 depends from the hanger.

By hanging the seismic sensor devices 100, access to such seismic sensor devices 100 can be made more convenient in the sensor storage system 200, as compared to sensor storage systems that store sensor devices in slots or seats, such as in a drawer. In some implementations, the hangers 204 are movable with respect to the support member 202, to cause corresponding movement of the seismic sensor devices 100 among direction 208.

Although FIG. 2 shows a hanger 204 hanging just one seismic sensor device 100, it is noted that in other examples, each hanger 204 can hang multiple seismic storage devices 100.

In some implementations, the hangers 204 can be coupled to a rail 203 that is moveable along the longitudinal axis of the rail 203 with respect to the support member 202. The movement of the rail 203 causes corresponding movement of the hangers 204 in the direction 208 (which is parallel to the longitudinal axis of the rail 203).

Figure 3:
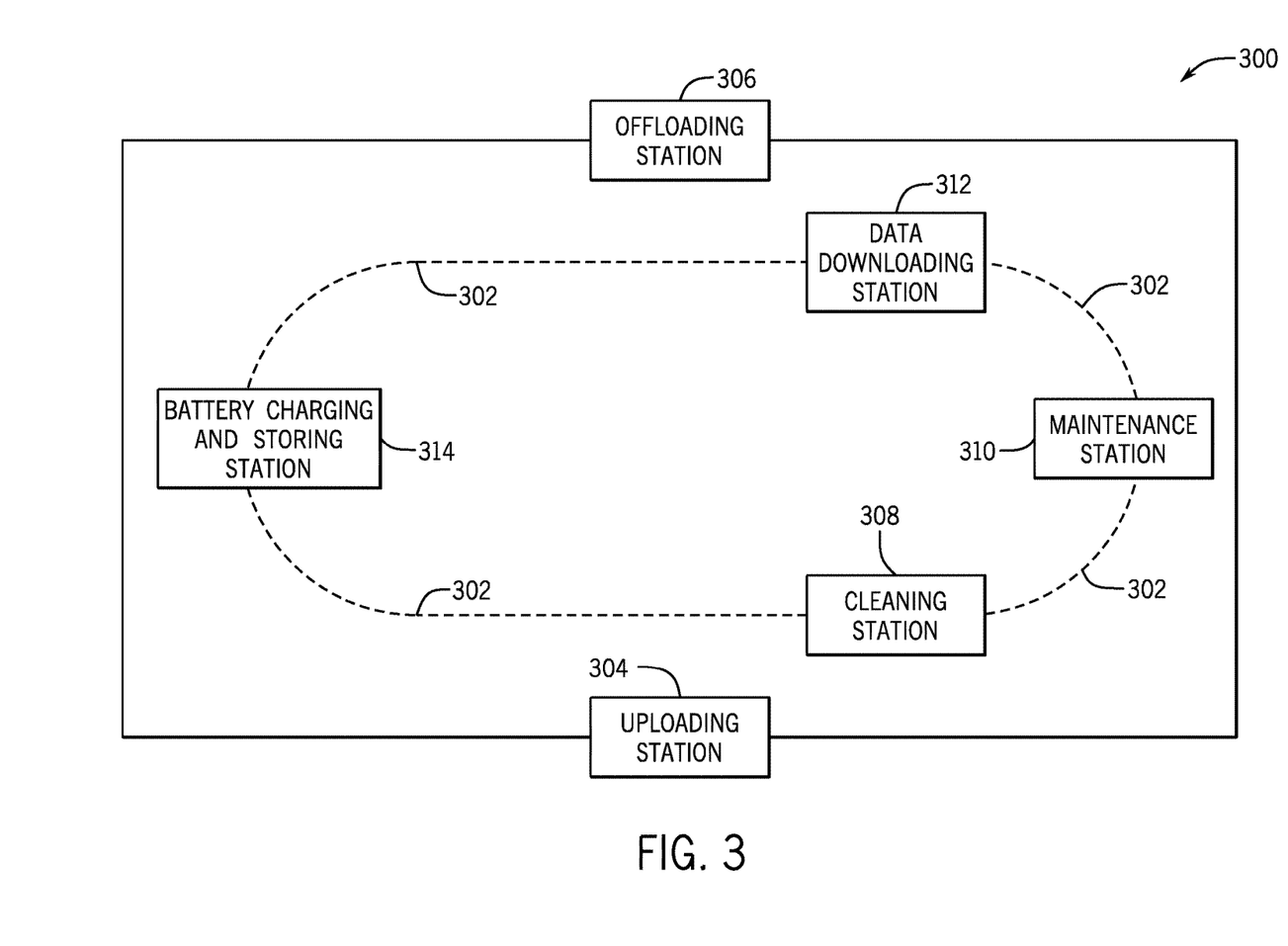

FIG. 3 is a top view of a sensor storage system 300, according to further implementations. A path of seismic sensor devices 100 in the sensor storage system 300 is represented by a dashed profile 302. In some examples, the dashed profile 302 can correspond to the path of a moveable rail (e.g. 203 in FIG. 2) that is attached to hangers to hang seismic sensor devices 100.

As depicted in FIG. 3, the sensor storage system 300 includes an uploading station 304, and an offloading station 306. The uploading station 304 is where one or multiple users (or robots) are able to mount the seismic sensor devices 100 into the sensor storage system 300, such as by hanging the seismic sensor devices 100 on the hangers 204 as shown in FIG. 2. The offloading station 306 is where one or multiple users (or robots) can offload the seismic sensor devices 100 from the sensor storage system 300, such as by removing the seismic sensor devices 100 from the hangers 204.

The sensor storage system 300 includes various processing stations, including a cleaning station 308, a maintenance station 310, a data downloading station 312, and a charging and storage station 314. Although a specific order of stations is depicted in FIG. 3, it is noted that a different order or arrangement of stations can be provided in other examples. Also, some of the stations shown in FIG. 3 can be omitted. In other examples, other types of stations can be included in the sensor storage system 300.

The cleaning station 308 is used for cleaning the seismic sensor devices 100 (such as to remove dirt or other residue) as the seismic sensor devices 100 pass through the cleaning station 308. For example, the cleaning station 308 can include one or more nozzles for spraying cleaning fluid onto seismic sensor devices 100. In addition, the cleaning station 308 can include a drying chamber with a dryer, which can include a blower (or multiple blowers) that can blow air over the seismic sensor devices 100 to dry the seismic sensor devices 100 after they have been sprayed with cleaning fluid.

The maintenance station 310 can perform various maintenance and/or quality control tasks with respect to the seismic sensor devices 100 as they pass through the maintenance station 310. For example, the maintenance station 310 can establish communications (wired or wireless communications) with the seismic sensor devices 100 as they pass through the maintenance station 310. In some examples, when a seismic sensor device 100 is attached to a hanger of the sensor storage system 300, both a mechanical connection and an electrical connection can be made with the seismic sensor device 100. In other examples, when a seismic sensor device 100 is attached to a hanger of the sensor storage system 300, an electrical cable can be connected to the seismic sensor device 100, to establish electrical communication with the seismic sensor device 100. In either case, as the seismic sensor device 100 passes through the maintenance station, electrical communication can be established with the seismic sensor device 100 to perform maintenance and/or quality control tasks.

In other examples, the maintenance station 310 can include a robot in the maintenance station 310 to remove a seismic sensor device 100 from a respective hanger (e.g., 204 in FIG. 2), to connect the seismic sensor device 100 to a connector to establish electrical communications with the seismic sensor device 100. Once maintenance and/or quality control is (are) performed, the robot can return the seismic sensor device 100 to a hanger. In yet further examples, wireless communication can be performed between the maintenance station 310 and a seismic sensor device 100 to perform the maintenance and/or quality control tasks.

A maintenance and/or quality control task can include determining whether the seismic sensor device 100 is operating normally. A test can be performed, such as by issuing a seismic signal and reading measurement data responsive to the seismic signal as acquired by the seismic sensor device 100. The measurement data can be analyzed to determine whether the seismic sensor device 100 is operating within specified tolerances.

Any seismic sensor device 100 can be marked by the maintenance station 310 as operating normally or as being faulty. Any seismic sensor device 100 marked as faulty can be removed at the offloading station 306.

Although not shown, another station that can be provided in the sensor storage system 300 is a station that can be used to roll a cable that is attached to a seismic sensor device 100.

The data downloading station 312 is able to establish communications (wired or wireless) with seismic sensor devices 100 that pass through the data downloading station 312, to download data stored in the seismic sensor devices 100. In some examples, if wireless communications can be established with the seismic sensor devices 100, then the data can be downloaded using wireless communication. In other examples, a seismic sensor device 100 can be electrically connected when attached to a hanger, or a cable can be connected to the seismic sensor device 100. As another example, a robot in the data downloading station 312 can be used to remove a seismic sensor device 100 from a hanger 204, and then connected to a connector so that data from the seismic sensor device 100 can be downloaded. After data download, the robot can return the seismic sensor device to a hanger.

In the battery charging and storage station 314, a seismic sensor device 100 can be removed (such as with a robot) and placed in a charging receptacle to perform charging of the seismic sensor device 100. While in the charging receptacle, the seismic sensor device 100 can be stored in the sensor storage system 300 until it is desired to again use the seismic sensor device 100.

In further examples where the seismic sensor devices 100 are electrically connected as well as mechanically connected to the hangers 204, the charging of the batteries of the seismic sensor devices 100 can be performed while the seismic sensor devices 100 are hanged by the hangers 204, so that a separate battery charging and storage station 314 can be omitted.

Although a single path 302 is depicted in FIG. 3, it is noted that in other examples, multiple paths can be provided for seismic sensor devices 100 in the sensor storage system 300. For example, another path can be provided from the battery charging and storage station 314 to the offloading location 306, or between any pair or collection of stations.

The multiple paths can be provided by multiple moveable rails that move in a looping manner. The rails can be moving constantly. A mechanism (e.g. that includes a robot, for example) can be used to move a seismic sensor device from one rail to another rail.

Figure 4A:
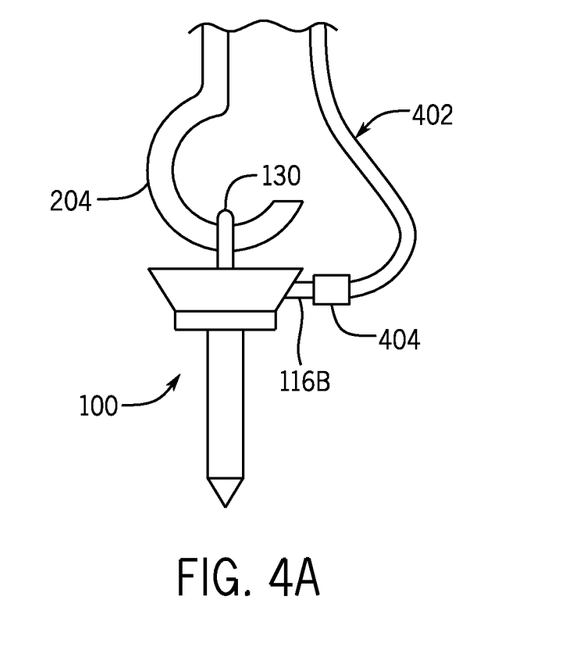
FIGS. 4A and 4B are schematic diagrams of hanging and communication connection mechanisms according to various implementations.

As shown in FIG. 4A, in some examples, each hanger 204 of a sensor storage system (e.g. 200 or 300) can include an electrical connection mechanism, such as in the form of an electrical cable 402 with a connector 404 to electrically connect to a communication medium (e.g. 116B) of the seismic sensor device 100. The cable 402 can be connected on its other end to a sensor storage system communication channel that allows for communication between a station of the sensor storage system and the seismic sensor device 100.

Figure 4B:
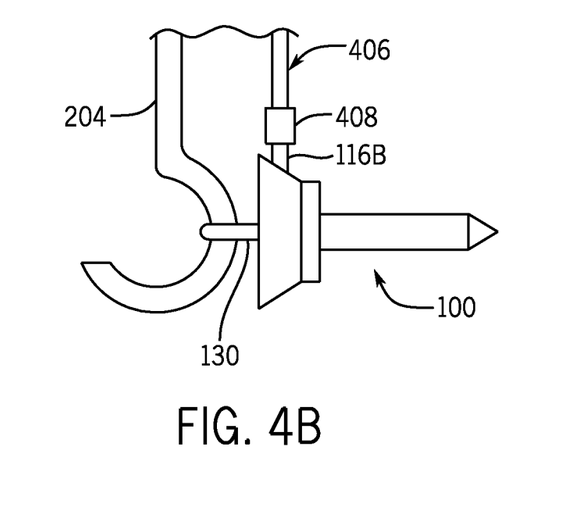

FIG. 4B is a schematic diagram of another example arrangement. In the arrangement of FIG. 4B, the hanger 204 can attach to the attachment handle 130 of the in a sideway manner. The hanger 204 includes a plug 406 with a connector 408 to electrically connect to a communication medium (e.g. 116B) of the seismic sensor device 100.

In further examples, an elongated cable (not shown) can to connect to multiple seismic sensor devices 100, where this elongated cable can run with the seismic sensor devices 100 as the seismic sensor devices 100 are moved through the sensor storage system.

Additionally, in examples where inductive coupling is used to charge the battery of a seismic sensor device 100, it is noted that an electrical connection does not have to be established with the seismic sensor device 100 for the purpose of charging the battery of the seismic sensor device 100.

In the ensuing discussion, although reference is made to establishing electrical connections with the seismic sensor devices 100 in a sensor storage system, it is noted that in other examples, optical connections can instead be established with the seismic sensor devices 100. More generally, a communication connection (electrical and/or optical connection) can be established between a sensor storage system and each seismic sensor device 100 to allow for communication (data communication and/or power communication) between the sensor storage system and the seismic sensor devices 100.

Figure 5:
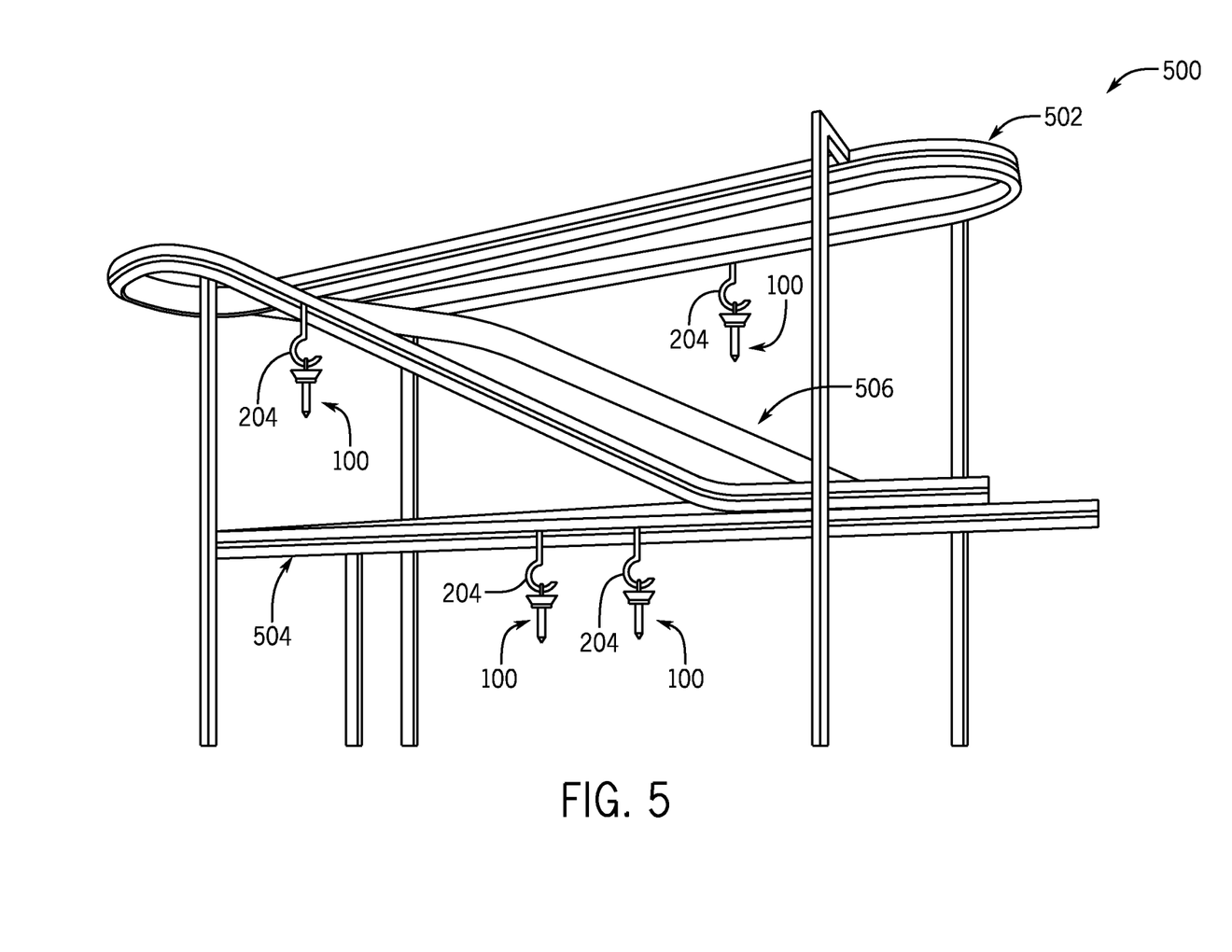

FIG. 5 is a schematic diagram of another sensor storage system 500, which includes multiple paths over which seismic sensor devices 100 can be provided. The sensor storage system 500 includes an upper rack 502, a lower rack 504, and an intermediate rack 506. The upper rack 502 includes various hangers 204 to hang seismic sensor devices 100. The hangers 204 of the upper rack 502 can be moved by a moveable rail of the upper rack 502. The hangers 204 (with any attached seismic sensor devices 100) can be moved to the intermediate rack 506. From the intermediate rack 506, the hangers 204 (and any attached sensor devices 100) can further be moved by a moveable rail of the intermediate rack 506 to the lower rack 404. The hangers 204 (and any attached seismic sensor devices 100) can further be moved by a moveable rail in the lower rack 504.

The following provides a further discussion of components in a seismic sensor device 100, as further shown in FIG. 6, which is a sectional view of the seismic sensor device 100. As shown in the sectional view of FIG. 6, the stick-shaped portion 102 has an elongated housing 106 having a length L along a longitudinal axis of the elongated housing 106. The elongated housing 106 also has a width W1 along a dimension of the elongated housing 106 that is perpendicular to the longitudinal axis. The length L is greater than the width W1 of the elongated housing 106. In some implementations, the length L can be 15 centimeters (cm) or greater, and the width W1 can be 2 cm or greater.

As further depicted in FIG. 6, sensor components 108A and 108B are contained within a chamber 110 inside the elongated housing 106 of the stick-shaped portion 102. Although just two sensor components are depicted in the example of FIG. 6, note that in further examples, more than two sensor components can be contained inside the chamber 110 of a single housing (i.e. the elongated housing 106). The elongated shape of the elongated housing 106 of the stick-shaped portion 102 of the sensor device 100 allows the sensor components 108A and 108B to be spaced apart along the longitudinal axis of the elongated housing 106, by a distance D. In some examples, the sensor components 108A and 108B can be arranged to be spaced apart by the distance D without providing particle motion sensors spaced apart in a direction perpendicular to the longitudinal axis. In some implementations, the sensor components 108A and 108B are co-axial along the longitudinal axis of the elongated housing 106.

The elongated housing 106 can be in the form of a hollow tube, a stick, or other elongated structure. In some examples, the elongated housing 106 can be cylindrical in shape. The cross section of the elongated housing 106 can be circular or non-circular in shape. Examples of non-circular cross-sections of the elongated housing 106 include a hexagon, a rectangle, or any other polygon.

The elongated housing 106 can be made out of a material, such as plastic (e.g. conductive plastic or non-conductive plastic), metal, a metal foam, a combination of plastic and metal (e.g. metal deposited on plastic or vice versa), and so forth.

By arranging the sensor components 108A and 108B in the elongated housing 106 as shown in FIG. 6, the sensor components 108A and 108B are spaced apart along just the longitudinal axis. In other words, in some implementations, the sensor device 100 does not include sensor components that are spaced apart in any other direction (other than a direction parallel to the longitudinal axis).

However, in further implementations, there can be sensor components that are spaced apart along the dimension of the width W1, for example.

The enlarged portion 104 of the sensor device 100 includes an outer housing 110 that defines an inner chamber in which various circuitry can be included. The outer housing 110 of the enlarged portion 104 can be formed of a material selected from the possible materials listed above for the elongated housing 106. A width W2 of the enlarged portion 104 (as measured along a dimension of the enlarged portion that is parallel to the dimension of the width W1 of the stick-shaped portion 102) is greater than the width W1. The larger size of the enlarged portion 104 allows greater space to accommodate circuitry. In some implementations, the width W2 is greater than the width W1 by a factor of 2 or greater, or 3 or greater.

The circuitry contained in the enlarged portion 104 can include a communication interface circuit 114, which is connected to communication media 116A and 116B (e.g. electrical cables, fiber optic cables, etc.). In other examples, the communication interface circuit 114 can communicate wirelessly over a wireless medium over which data can be communicated. The communication interface circuit 114 is electrically connected to the sensor components 108A and 108B. Data acquired by the sensor components 108A and 108B are transferred to the communication interface circuit 114, which in turn transmits the acquired data over the communication media 116A, 116B for communication to a remote station, which can be a recording station, a computer, and so forth.

According to other examples, a memory can be provided and incorporated in the enlarged portion 104. The memory can also be separate from the sensor device 100 and connected by wire, or short range wireless technology such as Wi-Fi or Bluetooth.

Also, the enlarged portion 104 can include control circuitry to control the sensor components 108A, 108B. Additionally, an analog-to-digital converter and other components may be included, such as in the communication interface circuit 114, to convert signals measured by the sensor components 108A, 108B into digital form. The components in the sensor device 100 may be powered by a battery, a solar panel, or through a wired or wireless connection. The enlarged portion 104 can include a battery.

The bottom portion of the sensor device 100 may include a spike 118 for driving the sensor device 100 into the ground surface 120. The spike 118 has a generally sharp tip 119 that allows for easier insertion of the sensor device 100 into the ground surface 120 to form a connection between the earth and the sensor device 100.

In some examples, the sensor components 108A and 108B are sensor chips. A sensor chip refers to an integrated circuit device that includes a substrate (e.g. semiconductor substrate) on which particle motion sensors can be provided. For example, the particle motion sensors that can be provided in the sensor chip 108A or 108B can include MEMS particle motion sensors, such as MEMS accelerometers. A MEMS particle motion sensor can include a micro element (e.g. a micro cantilever) that is moveable in response to particle motion, where the movement of the micro element can be detected by a sensing element. In other examples, the sensor components 108A and 108B can include other types of particle motion sensors. It should be noted that the MEMS particle motion sensors do not have to be on the "chip," but that is an option.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A sensor storage system comprising:
   a first moveable rail attached to hangers to hang respective sensor devices; and
   a station through which at least one of the sensor devices is to pass in response to movement of the moveable rail, the station to perform a task with respect to the at least one sensor device, wherein the station is at least one of a cleaning station comprising a nozzle to deliver cleaning fluid to the at least one sensor device, a battery charging station comprising a receptacle to receive the at least one sensor device to charge the at least one sensor device, or a maintenance station to perform maintenance or quality control of the at least one sensor device.

2. The sensor storage system of claim 1, further comprising a second moveable rail attached to further hangers to hang further sensor devices.

3. The sensor storage system of claim 2, further comprising racks at a plurality of levels, wherein the first moveable rail is part of a rack at one of the plurality of levels, and the second moveable rail is part of a rack at another of the plurality of levels.

4. The sensor storage system of claim 1, further comprising a cable or a plug to establish a communication connection between the sensor storage system and a given sensor device of the sensor devices as the given sensor device is attached to a respective hanger of the hangers.

5. The sensor storage system of claim 1, further comprising an uploading station to upload a sensor device to the first moveable rail, and an offloading station to offload a sensor device from the first moveable rail.

* * * * *